(12) United States Patent
Keller et al.

(10) Patent No.: US 6,767,981 B1
(45) Date of Patent: Jul. 27, 2004

(54) THERMOSET AND CERAMIC CONTAINING SILICON AND BORON

(75) Inventors: Teddy M. Keller, Fairfax Station, VA (US); David Y. Son, Dallas, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/254,938

(22) Filed: Sep. 26, 2002

(51) Int. Cl.[7] .................. C08G 79/08; C08G 77/56; C04B 35/00
(52) U.S. Cl. .................. 528/8; 528/4; 528/30; 528/32; 525/474; 525/475; 525/479; 501/82; 501/154
(58) Field of Search .................. 528/4, 8, 30, 32; 525/474, 475, 479; 501/82, 154

(56) References Cited

U.S. PATENT DOCUMENTS

| | | | |
|---|---|---|---|
| 2,431,878 A | | 12/1947 | McGregor et al. |
| 4,152,509 A | * | 5/1979 | Yajima et al. .................. 528/4 |
| 4,847,154 A | | 7/1989 | Ryang |
| 4,851,491 A | * | 7/1989 | Riccitiello et al. ............. 528/4 |
| 4,885,403 A | | 12/1989 | Inbasekaran et al. |
| 4,940,767 A | | 7/1990 | Barton et al. |
| 4,952,658 A | * | 8/1990 | Kalchauer et al. ............. 528/34 |
| 4,965,332 A | | 10/1990 | Barton et al. |
| 5,233,006 A | * | 8/1993 | Wolter et al. .................. 528/32 |
| 5,272,237 A | | 12/1993 | Keller et al. |
| 5,292,779 A | | 3/1994 | Keller et al. |
| 5,292,830 A | | 3/1994 | Funayama et al. |
| 5,348,917 A | | 9/1994 | Keller et al. |
| 5,483,017 A | | 1/1996 | Keller et al. |
| 5,559,189 A | | 9/1996 | Dirlikov et al. |
| 5,594,075 A | | 1/1997 | Reinhardt et al. |
| 5,644,014 A | * | 7/1997 | Schmidt et al. ............... 528/43 |
| 5,665,845 A | * | 9/1997 | Allman .......................... 528/8 |
| 5,681,870 A | | 10/1997 | Keller et al. |
| 5,693,689 A | * | 12/1997 | Gibbon ....................... 523/137 |
| 5,844,052 A | | 12/1998 | Keller et al. |
| 5,981,678 A | | 11/1999 | Keller et al. |
| 5,986,032 A | | 11/1999 | Keller et al. |
| 6,187,426 B1 | * | 2/2001 | Jonschker et al. ........ 428/292.1 |
| 6,225,247 B1 | | 5/2001 | Keller et al. |
| 6,441,086 B1 | * | 8/2002 | Wolfer et al. ............... 524/588 |

* cited by examiner

*Primary Examiner*—Jeffrey B. Robertson
(74) *Attorney, Agent, or Firm*—Stephen T. Hunnius; John J. Karasek (57) ABSTRACT

A thermoset polymer has a repeating unit comprising at least one crosslinking group having at least one unsaturated carbon-carbon bond and at least two crosslinking bonds, at least one borate group, at least one silyl group and/or at least one siloxyl group. The thermoset polymer of the present invention may be prepared by reacting a first compound having at least one alkynyl group, and at least one group selected from silyl groups and siloxyl groups, with a second compound selected from boric acid, hydrocarbon boronic acid, hydrocarbon borate, and pyroboric acid under reaction conditions sufficient to crosslink a sufficient number of alkyne bonds to form the thermoset polymer. The thermoset polymer of the present invention possesses both the processability of an organic polymer and the thermal and oxidative stability of an inorganic polymer. The thermoset polymer of the present invention may be further processed into a ceramic material by pyrolysis.

36 Claims, 2 Drawing Sheets

THERMOSET AND CERAMIC CONTAINING SILICON AND BORON

BACKGROUND OF THE INVENTION

1. Field of the Invention

The present invention relates to thermoset polymers and ceramics, and more particularly to silicon and boron-containing thermoset polymers and ceramics.

2. Description of the Related Technology

Thermally stable polymeric elastomers consisting of alternating carborane and siloxane groups are known for both the deca- and penta-carboranes ($HCB_{10}H_{10}CH$ and $HCB_5H_5CH$ respectively). See, for example, U.S. Pat. No. 3,463,801. Some have been produced commercially. However, these materials do not contain alkynyl moieties such as acetylenic groups or any other functional group for crosslinking to produce thermosetting polymers. These poly (carborane-siloxane) elastomers show superior thermal (high chars) and oxidative properties (low weight loss) at elevated temperatures (900° C.) as compared to analogous poly(siloxanes) as monitored by thermogravimetric analysis (TGA).

Silylene or siloxane-acetylene and silylene or siloxane-diacetylene polymers have also been reported. See, for example, U.S. Pat. No. 5,483,017. Good quality fibers can be drawn from the melts of the silylene polymers either thermally or with UV light, but they lack the thermally and oxidatively stable boron-containing units.

Linear inorganic-organic copolymers containing acetylenic and either bis(silyl or siloxyl) carboranyl units or a random distribution of both bis(silyl or siloxyl)carboranyl and bis(sily or siloxy) units have also been described. See, for example, U.S. Pat. No. 5,272,237. However, these polymers contain carborane units in each repeating unit which add to their cost.

Accordingly, it is an objective of certain embodiments of the present invention to provide a thermoset polymer having improved thermal stability by incorporating boron into its backbone.

It is another objective of certain embodiments of the present invention to provide a low cost boron-containing thermoset polymer.

SUMMARY OF THE INVENTION

In a first aspect, the present invention provides a thermoset polymer produced by reacting a first compound having at least one alkynyl group, at least one silyl group and/or at least one siloxyl group, with a second compound selected from boric acid, hydrocarbon boronic acid, hydrocarbon borate, and pyroboric acid under reaction conditions sufficient to crosslink a sufficient number of alkyne bonds to produce a thermoset polymer.

In a second aspect, the present invention provides a method of preparing a thermoset polymer including the step of reacting a first compound having at least one alkynyl group, at least one silyl group and/or at least one siloxyl group, with a second compound selected from boric acid, hydrocarbon boronic acid, hydrocarbon borate, and pyroboric acid under reaction conditions sufficient to crosslink a sufficient number of alkyne bonds to produce a thermoset polymer.

In a third aspect, the present invention provides a thermoset polymer having a repeating unit comprising at least one crosslinking group having at least one unsaturated carbon-carbon bond and at least two bonds that form crosslinks between polymer chains, at least one borate group, at least one silyl group and/or at least one siloxyl group.

In a fourth aspect, the present invention provides a ceramic material produced by pyrolyzing a combination of a first compound having at least one alkynyl group, at least one silyl group and/or at least one siloxyl group and a second compound selected from boric acid, hydrocarbon boronic acid, hydrocarbon borate, and pyroboric acid; or by pyrolyzing a polymeric composition reaction product of a combination of the first and second compounds.

DETAILED DESCRIPTION OF THE PREFERRED EMBODIMENT(S)

In a first aspect, the present invention provides a thermoset polymer produced by heating a combination of a first compound having at least one alkynyl group, at least one silyl group and/or at least one siloxyl group, and a second compound selected from boric acid, hydrocarbon boronic acid, hydrocarbon borate, and pyroboric acid to a temperature sufficient to crosslink a sufficient number of alkyne bonds to produce a thermoset polymer.

Generally, a siloxyl group is represented by the formula and a silyl group is represented by the formula:

wherein $R_1$, $R_2$, $R_3$ and $R_4$ represent hydrocarbon groups, hydrogen, silyl groups, or siloxyl groups.

Hydrocarbon groups generally refer to branched or straight chain hydrocarbon which may be unsubstituted hydrocarbon groups such as alkyl, alkylaryl, arylalkyl and aryl groups; or substituted hydrocarbon groups such as, halo-substituted hydrocarbons, hydrocarbons with hybrid rings, hydrocarbons substituted with oxygen, nitrogen, boron, sulfur, silicon and phosphorus, and metal-containing hydrocarbons. In a preferred embodiment, the hydrocarbon group contains 1 to 20 carbon atoms.

In another embodiment, the thermoset polymer of the present invention is produced by heating a polymeric composition formed from a first compound having a repeating unit including at least one alkynyl group, at least one silyl group and/or at least one siloxyl group, and a second compound selected from boric acid; hydrocarbon boronic acid such as alkyl boronic acid and aryl boronic acid (i.e., $C_6H_5B(OH)_2$); hydrocarbon borate such as ethyl borate or boron oxide (also called boric anhydride); and pyroboric acid, to a temperature sufficient to crosslink a sufficient number of alkyne bonds.

In a preferred embodiment, the first compound is a poly(siloxane-acetylene) having the general formula:

wherein m, n, z, and y are independently selected from positive integers and $R_1$–$R_4$ are hydrocarbon groups. Methods for the preparation of poly(siloxane-acetylene) are generally known to a skilled person in the art. For example, poly(siloxane-acetylene) may be prepared by reacting a salt of an alkyne or a respective Grignard reagent with an alpha, omega-dihalosiloxane. The following scheme illustrates a reaction to produce a poly(siloxane acetylene).

wherein m, z and y are independently selected from positive integers; $R_1$–$R_4$ are independently selected from a hydrocarbon group, hydrogen, a silane group and a siloxane group; M represents Li, Na, K, Rb, Cs, or MgX with X being F, Cl, Br, or I; and L represents halogens or other suitable elements. Methods for preparation of the alkyne salt or the respective Grignard reagent are known to a skilled person. Alpha, omega-dihalosiloxane can be purchased from commercial sources such as Aldrich Chemical.

As an example, the synthesis of an exemplary poly (siloxane acetylene) is depicted in the following scheme using specific exemplary compounds.

The second compound is preferably a boron-containing compound such as boric acid; hydrocarbon boronic acid such as alkyl boronic acid or aryl boronic acid (i.e., $C_6H_5B(OH)_2$); a hydrocarbon borate such as ethyl borate (also referred to as alkyl boric ester), or boron oxide; and pyroboric acid. More preferably, the second compound is boric acid.

Under suitable conditions, the first compound reacts with the second compound to initially form a polymeric composition having a repeating unit, which includes at least one alkynyl group, at least one borate group, at least one silyl group and/or at least one siloxane group. The formed polymeric composition may be converted to a thermoset polymer by heating or subjecting it to other suitable crosslinking conditions, such as exposure to radiation or a transition metal catalyst. The conversion of the polymeric composition into the thermoset polymer results from crosslinking of the alkynyl groups in the polymeric composition and may be performed under either an inert or oxidizing atmosphere. The thermoset polymer may further undergo pyrolysis to form a ceramic material.

The following scheme illustrates one preferred embodiment of this process.

wherein:
(1) m, n and y are independently selected from positive integers; z is selected from zero or positive integers;
(2) $R_1$, $R_2$, $R_3$, and $R_4$, are independently selected from a hydrocarbon group, hydrogen, a silane group, and a siloxane group;
(3) $R_5$ is selected from the group consisting of —H, a hydrocarbon group, a siloxane group, and a repeating unit of the formula of the poly(siloxane acetylene); when $R_5$ is a phenyl group or other similar hydrocarbon groups, the polymer of formula I may be mainly crosslinked through the groups represented by "Ae;"
(4) $R_6$ is $OR_5$ or a hydrocarbon group; and
(5) Ae is a group with at least one unsaturated carbon-carbon bond and at least two crosslinking bonds, which may be bonds that form crosslinks between polymer chains; and
(6) R' is a hydrocarbon group.

The formation of the polymeric composition from the first and second compounds may preferably be carried out by mixing the first and second compounds with heating, optionally in a suitable solvent such as tetrahydrofuran (THF). The resultant polymeric composition may contain a linear, branched or crosslinked polymer depending on the choice of the first and second compounds and the ratio therebetween.

The conversion of the polymeric composition to the thermoset polymer is accomplished by exposing the polymeric composition to heat, light or a transition catalyst. Thermal conversion of the carbon-to-carbon triple bonds in the polymeric composition to form the thermoset polymer is dependent on both the curing temperature and the curing time. The heating of the polymeric composition is carried out over a curing temperature range and a curing time sufficient for the crosslinking of a sufficient number of the carbon-to-carbon triple bonds of the polymeric composition to occur resulting in the formation of a single mass of crosslinked thermoset polymer. In general, the curing time is inversely related to the curing temperature. The typical curing temperature range for the thermal conversion of polymeric composition to the cross-linked thermoset polymer is 150–450° C., the preferred temperature range is 200–400° C., the more preferred temperature range is 225–375° C., and the most preferred temperature range is 250–350° C. The typical curing time for the thermal conversion of polymeric composition to the cross-linked thermoset polymer is 1–48 hours, the preferred curing time is 2–24 hours, the more preferred curing time is 8–16 hours, and the most preferred curing time is 6–10 hours.

The photocrosslinking process, of converting the carbon to-carbon triple bonds of the polymeric composition into unsaturated cross-linked moieties necessary for forming the thermoset polymer, is dependent on both the exposure time and the intensity of the light used during the photocrosslinking process. Ultraviolet (UV) light is the most preferred wavelength of light used during the photocrosslinking process. The exposure time of the polymeric composition to the UV light is inversely related to the intensity of the UV light used. The exposure time to the UV or to other light used is that time which is sufficient for the carbon-to-carbon triple bonds of the polymeric composition to be crosslinked to form the thermoset polymer. The intensity of the light used is that intensity which is sufficient for the carbon-to-carbon triple bonds of the polymeric composition to be crosslinked to form the thermoset polymer. Furthermore, the wavelength of the light used is not limited to the UV range. The wavelength of light used is that wavelength which is sufficient for the carbon-to-carbon triple bonds of the polymeric composition to be crosslinked to form the thermoset polymer. The typical exposure time is 1–100 hours, the preferred exposure time is 24–36 hours, the more preferred exposure time is 12–24 hours and the most preferred exposure time is 4–8 hours. Examples of the conversion of polymeric composition to the crosslinked thermoset are given infra.

Figure 1:
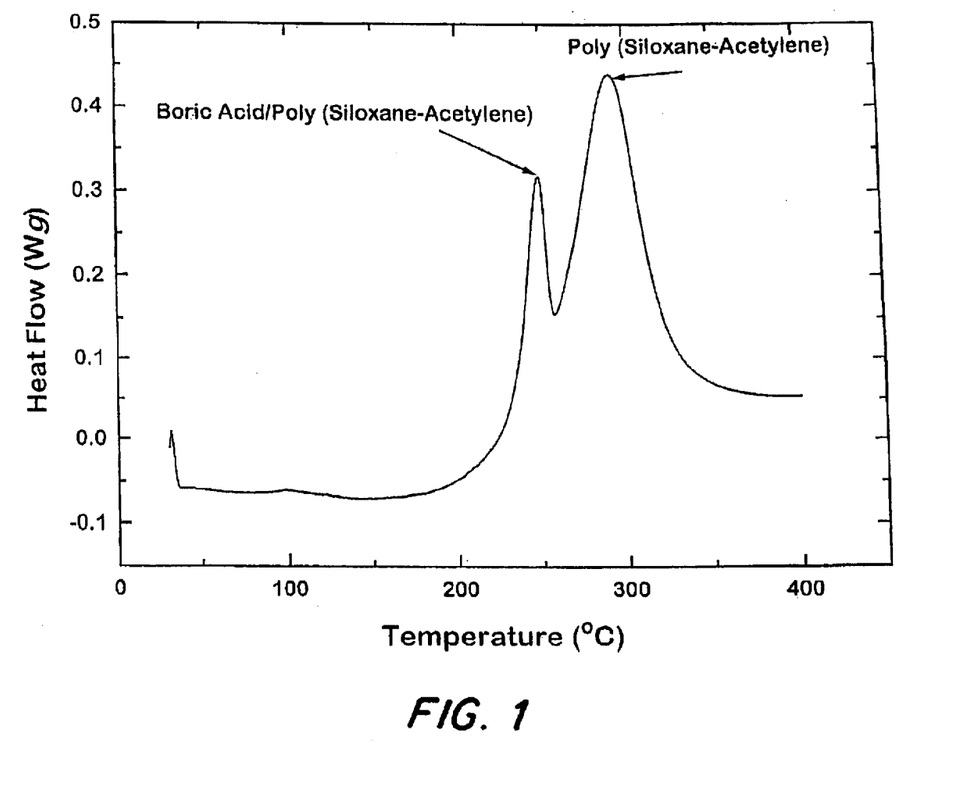
FIG. 1 illustrates a TGA thermogram of a thermoset polymer according to the present invention.

Generally, the infrared spectra of the thermoset polymers of the present invention show virtually no evidence of any remaining alkynyl groups in the material. Little weight loss is observed and some volume shrinkage may occur during the crosslinking step. The thermoset polymers exhibit high thermal stabilities as demonstrated by a TGA thermogram of a thermoset polymer as shown in FIG. 1. In another example, a thermoset polymer from a polymeric composition formed from poly(siloxane-acetylene) and boric acid at a weight ratio of 10:1, respectively, is stable to approximately 500° C. in air.

In an even more preferred embodiment, the first compound and the second compound are combined at a suitable ratio between 1:1 and 400:1 by weight, respectively, and heated to an elevated temperature. The resulted product is a hard, shiny, void-free thermoset polymer.

In a preferred embodiment, poly(siloxane-acetylene) and boric acid are combined at a weight ratio between 5:1 and 10:1, respectively, and heated to a temperature between 100° C. and 150° C. for a short period time, such as half an hour, and further to a temperature between 200° C. and 400° C. for about 4–8 hours to form the thermoset polymer of the present invention.

In another preferred embodiment, boric acid is added to a tetrahydrofuran solution of poly (siloxane-acetylene), followed by heating the mixture to reflux for 1 to 5 hours. The THF is then removed under reduced pressure leaving a viscous or rubbery polymeric composition. The viscous or rubbery polymeric composition is then further cured or crosslinked by heating to a temperature between 200° C. and 400° C. or being exposed to a suitable radiation source.

In another aspect, the present invention provides a thermoset polymer having a repeating unit including at least one crosslinking group having at least one unsaturated carbon-carbon bond and at least two crosslinking bonds, at least one borate group, at least one silyl group and/or siloxyl group. In a preferred embodiment, the repeating unit of the thermoset polymer may further include a silyl group.

A borate group is a group represented by the formula:

wherein $R_5$ is selected from the group consisting of a hydrocarbon group, —OH, and —$OR_6$; wherein $R_6$ is a hydrocarbon group, a siloxane group, or a repeating unit of the formula I.

Hydrocarbon groups generally refer to branched or straight chain hydrocarbons which may be unsubstituted hydrocarbon groups such as alkyl, alkylaryl, arylalkyl and aryl groups; or substituted hydrocarbon groups such as, halo-substituted hydrocarbons, hydrocarbons with hybrid rings, hydrocarbons substituted with oxygen, nitrogen, boron, sulfur, silicon and phosphorus, and metal-containing hydrocarbons. In a preferred embodiment, the hydrocarbon group contains 1 to 20 carbon atoms.

In a preferred embodiment, the thermoset polymer of the present invention has a repeating unit that is represented by the formula I:

Formula I wherein:
(1) m, n and y are independently selected from positive integers; z is selected from zero or positive integers;
(2) $R_1$, $R_2$, $R_3$, and $R_4$, are independently selected from a hydrocarbon group, hydrogen, a silane group, and a siloxane group;
(3) $R_5$ is selected from the group consisting of —OH, a hydrocarbon group, a siloxane group, and a repeating unit of the formula of the poly(siloxane acetylene); when $R_5$ is a phenyl group or other similar hydrocarbon groups, the polymer of formula I may be mainly crosslinked through the groups represented by "Ae;"
(4) $R_6$ is $OR_5$ or a hydrocarbon group; and
(5) Ae is a group with at least one unsaturated carbon-carbon bond and at least two crosslinking bonds.

More preferably, $R_1$, $R_2$, $R_3$, and $R_4$ are independently selected from the group consisting of a haloalkyl having up to 20 carbon atoms; a haloaryl groups having up to 20 carbon atoms; alkyl, aryl, arylalkyl, and alkylaryl hydrocarbon groups having up to 20 carbon atoms; and hydrogen. Also, preferably, m and n are positive integers and z is 0.

Preferably, the crosslinking group having at least one unsaturated carbon-carbon bond includes a moiety selected from the group consisting of and combinations thereof, wherein ⌇⌇⌇ stands for a crosslinking bond.

The thermoset polymer may be further converted to a ceramic material upon pyrolysis. Accordingly, in another aspect, the present invention provides a ceramic material containing silicon, boron and carbon. The ceramic material of the present invention may be produced by pyrolyzing the thermoset polymer of the present invention. In another embodiment, the ceramic material may be prepared by directly pyrolyzing a combination of the first and second compounds at the same ratio as used in preparing the thermoset polymer of the present invention.

"Pyrolyzing" in the context of the invention means heating a material to an extremely high temperature under air or an inert atmosphere for a sufficient time to remove all the potential volatiles. In general, the pyrolyzing time is inversely related to the pyrolyzing temperature. Preferably, "pyrolyzing" means heating a material to above 400° C. under an inert atmosphere such as nitrogen.

Figure 2:
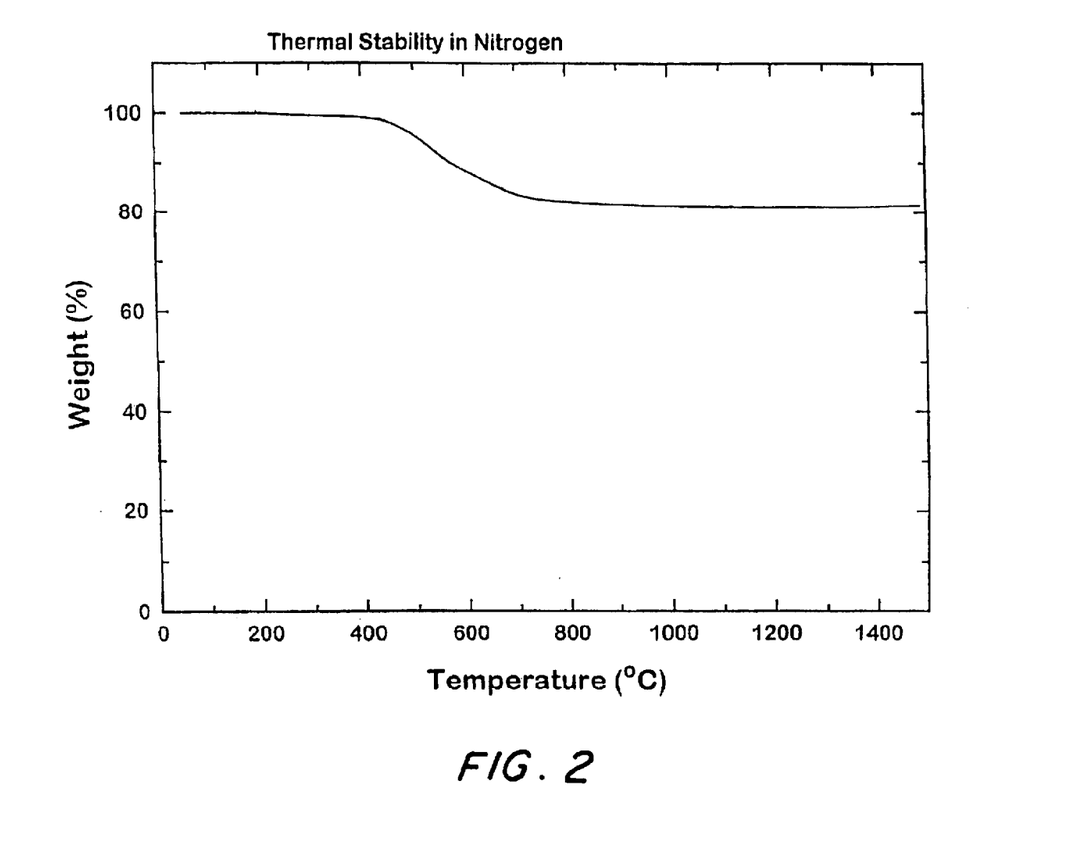
FIG. 2 illustrates a TGA thermogram of a ceramic material derived from a thermoset polymer according to the present invention.

In one embodiment, a ceramic of the invention shows an overall weight loss of only 9% when heated to 1500° C. in the air as shown in FIG. 2. This characteristic of the ceramic suggests the feasibility of using these materials in high temperature applications.

The thermoset polymers of the present invention contain siloxyl and/or silyl, borate groups, and crosslinking units having at least one unsaturated carbon-carbon bond and at least two crosslinking bonds, in the backbone. One advantage of these thermoset polymers is that the combination of borate and siloxane and/or silane groups, results in high thermal and oxidative stability at elevated temperatures, while the organic constituents of the thermoset polymers make the thermoset polymers more processable before they are crosslinked.

The synthesis of the thermoset polymers of the present invention may be accomplished by simple one-pot reactions that provide high yields. The nature of this reaction makes it simple to change the chemical makeup of the thermoset polymers by varying molar or weight ratios of the first and second compounds. Changing the ratio between the first compound and the second compound may result in variations of the silicon:boron ratio, the silicon:carbon ratio, the branching density, and/or the crosslinking properties of the thermoset polymer of the present invention.

Another important way to modify the chemical composition of the polymer is to change the composition of the first compound used to prepare the polymeric composition. For example, using a poly(siloxane-acetylene) with block acetylenic repeating units would result in a thermoset polymer with block crosslinking units in its backbone. In another example, variations in the ratio of siloxyl and acetylenic units in the poly(siloxane-acetylene) starting material would also vary the ratio of siloxyl and acetylenic units in the polymeric composition and, thus, modify the physical properties of the resulting thermoset polymer. Accordingly, it is possible to tailor the thermoset polymer according to specific needs.

Thermoset polymers produced by combining poly (siloxane-acetylene) and boric acid at weight ratios of 5:1 and 10:1 according to the present invention, respectively, were tested for thermal stability under nitrogen flow up to 1500° C. and resulted in char yields of 77% and 80%, respectively. Further thermal analysis of the chars in air to 1500° C. shows excellent oxidative stability of the pyrolyzed material. The high char yield of these thermosets also suggests that they can be used as a preceramic material. Thus, the polymeric composition can be molded into component shapes, cured to the thermosets, and then pyrolyzed into the ceramic bodies if desired.

The thermoset polymer of present invention and products derived by further thermal treatment may find applications in aerospace programs in components of rockets and aircraft engines.

The amounts of the boron and/or silicon-containing groups relative to the number of crosslinking groups can be varied by controlling the ratios of the reactants and the composition of the reactants in the synthesis. A suitable combination of reactants can be found to produce a thermoset polymer suitable for a particular application, which will be a function of the physical properties desired.

Thermoset polymers containing borate, silyl and/or siloxyl groups can exhibit electrical conductivity properties, which could make these polymers useful in the microelectronic industry and as nonlinear optical materials (NLO). Thermoset polymers with various electrical and/or optical properties could be easily synthesized by varying the substituents on one or both of the boron and silicon-containing groups.

The polymeric composition, the thermoset polymer of the invention and ceramics derived therefrom, may be impregnated with additives, fillers and/or fibers to form composites and processed into complex shapes. These composites may be used in numerous different applications such as serving as components that must withstand exposure to high temperatures.

The invention will be further illustrated by way of the Examples given below.

EXAMPLE 1

Preparation of 1,4-dilithio-1,3-butadiyne

A 50-mL three-necked, round-bottomed flask was equipped with a stir bar, glass stopper, septum, and gas inlet tube. After the flask was flame-dried, THF (5 mL) was injected and the flask was placed in a dry ice/acetone bath. n-BuLi (10.6 mL of a 2.5 M solution, 26.5 mmol) was then added and the mixture was stirred for 5 min. Subsequently, hexachlorobutadiene (0.99 mL, 6.3 mmol) was added dropwise via a syringe. After completion of addition, the cold bath was removed and the mixture was stirred at room temperature for two hours. The resulting dark brown mixture contained 1,4-dilithio-1,3-butadiyne.

EXAMPLE 2

Synthesis of poly(siloxane-acetylene)

A mixture of 1,4-dilithio-1,3-butadiyne (6.3 mmol), obtained by the process of Example 1, in THF/hexane was cooled in a dry ice/acetone bath. To this mixture, 1,3-dichlorotetramethyldisiloxane (1.24 ml, 6.3 mnol) was added dropwise over 15 min. After the addition, the cold bath was removed and the mixture was stirred at room temperature for two hours. The obtained tan colored mixture was poured into 20 ml of ice cooled saturated aqueous ammonium chloride solution with stirring. The mixture was filtered through a Celite pad and the layers of the filtrate were separated. The aqueous layer was extracted twice with diethyl ether. All of the organic layers including those derived from extraction were combined and the combined organic layers were washed twice with distilled water and once with saturated aqueous NaCl solution. The remaining dark brown organic layer was dried over anhydrous magnesium sulfate and filtered. Most of the volatiles in the organic layer were removed at reduced pressure and the residue was heated at 75° C. for three hours at 0.1 torr to give poly(siloxane-acetylene) as a thick, dark brown material (1.04 g, 92%). The polymer slowly solidified on standing at room temperature and liquefied at approximately 70° C.

EXAMPLE 3

Reaction of poly(siloxane-acetylene) with 5 weight percent of boric acid

Poly(siloxane-acetylene) (0.5 g) and boric acid (0.025 g) were weighed into a 25 ml round bottom flask. To the flask was added 5 ml of dry THF and the resulting mixture was refluxed (68° C.) for 8 hrs. The THF was then removed by distillation with complete removal of solvent being accomplished at reduced pressure to afford 0.5 g of product, a polymeric composition of the present invention.

EXAMPLE 4

Reaction of poly(siloxane-acetylene) with 10 weight percent of boric acid

Poly(siloxane-acetylene) (5.0 g) and boric acid (0.5 g) were weighed into a 2-necked, 50 ml flask equipped with a thermometer and a reflux condenser. To the flask was added 25 ml of dry THF and the mixture was refluxed for 3 hrs. under an inert atmosphere. The solvent (THF) was then distilled from the flask leaving as the reaction product (5.5 g), a polymeric composition of the present invention.

EXAMPLE 5

Reaction of poly(siloxane-acetylene) with 20 weight percent of boric acid

Poly(siloxane-acetylene) (5.0 g) and boric acid (1.0 g) were weighed into a 2-necked, 50 ml flask equipped with a thermometer and a reflux condenser. To the flask was added 25 ml of dry THF and the mixture was refluxed (68° C.) for 3 hrs. under an inert atmosphere. The solvent (THF) was then distilled from the flask leaving as the reaction product (5.9 g), a polymeric composition of the present invention.

EXAMPLE 6

Thermal conversion of the polymeric composition of Example 3 to a thermoset polymer Poly(siloxane-acetylene)/boric acid polymeric composition (25.25 mg) prepared by Example 3 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy thermoset polymer.

EXAMPLE 7

Thermal conversion of poly(siloxane-acetylene)/ boric acid composition (90/10 weight Percent) from Example 4 to a thermoset polymer Poly(siloxane-acetylene)/boric acid polymeric composition (23.51 mg) of Example 4 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy thermoset polymer.

EXAMPLE 8

Oxidative aging study on the thermoset polymer from Example 7

The thermoset polymer from Example 7 was cooled and aged in a flow of air (100 cc/min) at 300, 350, and 400° C. for 4 hr at each temperature and at 450° C. for 10 hr resulting in a residue of about 70% of the original weight. During the heat treatment at 300° C., the sample gained about 5.6% of its weight. While heating at 350 and 400° C., the sample lost a total of 2.5% and 8.0% of its weight, respectively.

EXAMPLE 9

Bulk thermal conversion of poly(siloxane-acetylene)/boric acid (90/10 weight percent) polymeric composition from Example 4

A sample (1.19 g) of poly(siloxane-acetylene)/boric acid polymeric composition obtained in accordance with Example 4 was weighed into an aluminum planchet. The sample was placed on a hot plate, which was situated inside of a dessicator. The sample was then heated at 110° C. for 1 hr and at 140–160° C. for 1.5 hrs while under full vacuum. During this time, volatiles were evolving from the surface of the melt and the composition was slowly increasing in viscosity. The temperature was further increased to 175° C. for 30 min. resulting in a further enhancement in viscosity. Upon cooling to room temperature, the sample was tacky and gummy. The sample was then placed in an oven and heated to 215° C. for 2 hrs, at 250° C. for 2 hrs, and at 350° C. for 3 hrs to convert the sample to a thermoset polymer.

EXAMPLE 10

Thermal conversion of poly(siloxane-acetylene)/ boric acid polymeric composition (80/20 weight percent) from Example 5 to a thermoset polymer Poly(siloxane-acetylene)/boric acid polymeric composition (30.99 mg) of Example 5 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy thermoset polymer.

EXAMPLE 11

Oxidative aging study on the glassy thermoset polymer from Example 10

The thermoset polymer from Example 10 was cooled and aged in a flow of air (100 cc/min) at 300, 350, and 400° C. for 4 hrs. at each temperature and at 450° C. for 10 hrs. resulting in a residue of about 76% of the original weight. During the heat treatment at 300° C., the sample gained about 4.6% of its weight. While at 350 and 400° C., the sample lost a total of 3.0% and 7.0% of the original weight, respectively.

EXAMPLE 12

Bulk thermal conversion of poly(siloxane-acetylene)/boric acid (80/20) weight percent) polymeric composition from Example 5

A sample (1.18 g) of poly(siloxane-acetylene)/boric acid (80/20) polymeric composition obtained by the process of Example 5 was weighed into an aluminum planchet. The sample was placed on a hot plate, which was situated inside of a dessicator. The sample was then heated at 110° C. for 1 hr and at 140–160° C. for 1.5 hrs. while under full vacuum. During this time, volatiles were evolving from the surface of the melt and the composition was slowly increasing in viscosity. The temperature was further increased to 175° C. for 30 min. resulting in a further enhancement in viscosity. Upon cooling to room temperature, the sample was tacky and gummy. The sample was then placed in an oven and heated to 215° C. for 2 hrs., at 250° C. for 2 hrs., and at 350° C. for 3 hrs. to convert the sample to a thermoset polymer.

EXAMPLE 13

Thermal conversion of the elastomeric polymeric composition (90/10) of Example 4 to a ceramic A sample of poly(siloxane-acetylene)/boric acid polymeric composition obtained by the process of Example 4 (23.50 mg) was placed on a thermogravimetric analysis (TGA) pan and heated to remove the volatiles contained therein at 200° C. for 1 hr resulting in a retention of 82.4% of its weight. Upon cooling, the residue was then heated up in a flow of nitrogen (50 cc/min) at a heating rate of 10° C./min to 1000° C. Most of the weight loss occurred between 400–600° C. resulting in a ceramic having 74.6% of the original weight.

EXAMPLE 14

Oxidative stability of the ceramic of Example 13

The ceramic of Example 13 was first cooled down and then heated up in a flow of air (100 cc/min) at a heating rate of 10° C./min to 1000° C. The sample commenced to slowly lose weight between 600–900° C. Between 900–1000° C., the weight loss stabilized with a weight retention of about 77%.

EXAMPLE 15

Thermal Conversion of the Poly(siloxane-acetylene)/boric Acid polymeric composition (80/20 weight percent) of Example 5 to a ceramic A sample of poly(siloxane-acetylene)/boric acid polymeric composition obtained by the process of Example 5 (23.50 mg) was placed on a thermogravimetric analysis (TGA) pan and heated to remove the volatiles contained therein at 200° C. for 1 hr resulting in a retention of 83% of its weight. Upon cooling, the residue was then heated up in a flow of nitrogen (50 cc/min) at a heating rate of 10° C./min to 1000° C. Most of the weight loss occurred between 400–600° C. resulting in a ceramic having 82 % of the original weight.

EXAMPLE 16

Oxidative stability of the ceramic of Example 15

The ceramic obtained by the process of Example 15 was first cooled down and then heated up in a flow of air (100 cc/min) with a heating rate of 10° C./min to 1000° C. The sample showed outstanding oxidative stability up to 730° C. with a weight gain of 0.4%. Between 800–1000° C., the sample commenced to lose weight with a weight retention of 93% at 1000° C.

It is to be understood that the foregoing detailed description is given merely by way of illustration and that many variations may be made within the principles of the invention to the full extent indicated by the broad general meaning of the terms in which the appended claims are expressed.

What is claimed is:

1. A thermoset polymer produced by reacting a first compound comprising at least one alkynyl group and at least one group selected from silyl groups and siloxyl groups, with a second compound selected from boric acid, hydrocarbon boronic acid, hydrocarbon borate, and pyroboric acid under reaction conditions sufficient to crosslink a sufficient number of alkyne bonds to produce a thermoset.

2. A thermoset polymer as claimed in claim 1, wherein said first compound comprises at least two repeating units comprising at least one alkynyl group and at least one siloxyl group.

3. A thermoset polymer as claimed in claim 1, wherein said first compound is a poly (siloxane-acetylene) and said second compound is boric acid.

4. A thermoset polymer as claimed in claim 1, wherein one said reaction condition is a reaction temperature of at least 150° C.

5. A thermoset polymer as claimed in claim 1, wherein said first compound and said second compound are combined at a weight ratio of between 1:1 and 400:1, respectively.

6. A thermoset polymer as claimed in claim 1, wherein said first compound and said second compound are combined at a weight ratio of between 5:1 and 10:1, respectively.

7. A thermoset polymer as claimed in claim 1, wherein said thermoset polymer comprises a repeating unit represented by the formula:

Formula I $$R_6\underset{OR_5}{\overset{R_1}{\underset{|}{B}}}-O\text{-}(\underset{R_2}{\overset{R_1}{\underset{|}{Si}}})_n\text{-}O\text{-}\underset{R_4}{\overset{R_3}{\underset{|}{Si}}})_z\left[(Ae)_m\text{-}(\underset{R_2}{\overset{R_1}{\underset{|}{Si}}})_n\text{-}O\text{-}\underset{R_4}{\overset{R_3}{\underset{|}{Si}}})_z\right]_{y-1}(Ae)_{m-1}\text{-}C{\equiv}CH$$

wherein:
(1) m, n and y are independently selected from positive integers; z is selected from zero or positive integers;
(2) $R_1$, $R_2$, $R_3$, and $R_4$, are independently selected from a hydrocarbon group, hydrogen, a silane group, and a siloxane group;
(3) $R_5$ is selected from the group-consisting of —OH, a hydrocarbon group, a siloxane group, and a repeating unit of the formula of the poly(siloxane acetylene);
(4) $R_6$ is $OR_5$ or a hydrocarbon group; and
(5) Ae is a group with at least one unsaturated carbon-carbon bond and at least two crosslinking bonds.

8. A thermoset polymer as claimed in claim 7, wherein m and n are positive integers, and z is one.

9. A thermoset polymer as claimed in claim 7, wherein $R_1$, $R_2$, $R_3$, and $R_4$ are independently selected from the group consisting of:
a haloalkyl group having up to 20 carbon atoms,
a haloaryl group having up to 20 carbon atoms,
an alkyl, aryl, arylalkyl, or alkylaryl hydrocarbon group having up to 20 carbon atoms, and hydrogen;
and wherein $R_5$ is a repeating unit of the formula of the poly(siloxane acetylene).

10. A thermoset polymer as claimed in claim 7, wherein Ae comprises a $$-\underset{\sim}{\overset{\sim}{C}}{=}\underset{\sim}{\overset{\sim}{C}}-\,,\quad =\underset{\sim}{\overset{\sim}{C}}-C{\equiv}C-\underset{\sim}{\overset{\sim}{C}}{=}\,,$$

group selected from the group consisting of:

$$-\underset{\sim}{\overset{\sim}{C}}{=}C{=}C{=}\underset{\sim}{\overset{\sim}{C}}-\,,\quad -\underset{\sim}{\overset{\sim}{C}}{=}\underset{\sim}{\overset{\sim}{C}}-C{\equiv}C-\,,$$

and combinations thereof, wherein ∼∼∼ stands for a crosslinking bond.

11. A thermoset polymer as claimed in claim 7, wherein n is 1.

12. A thermoset polymer as claimed in claim 7, wherein m is 2.

13. A thermoset polymer as claimed in claim 7, wherein said second compound is phenyl boronic acid.

14. A thermoset polymer having a repeating unit comprising at least one crosslinking group having at least one unsaturated carbon-carbon bond and at least two crosslinking bonds, at least one borate group, and at least one group selected from silyl groups and siloxyl groups.

15. A thermoset polymer as claimed in claim 14, wherein said repeating unit further comprises at least one silyl group.

16. A thermoset polymer produced by a method comprising the steps of forming a polymeric composition having a repeating unit comprising at least one alkynyl group, at least one borate group, and at least one group selected from silyl groups and siloxyl groups, and crosslinking said polymeric composition through said at least one alkynyl group.

17. A thermoset polymer as claimed in claim 16, wherein the step of forming said polymeric composition involves reacting a first compound comprising at least one alkynyl group, and at least one group selected from silyl groups and siloxyl groups, and a second compound selected from the group consisting of boric acid, hydrocarbon boronic acid, hydrocarbon borate, and pyroboric acid.

18. A thermoset polymer as claimed in claim 17, wherein said first compound comprises poly(siloxane-acetylene) and said second compound comprises boric acid.

19. A thermoset polymer as claimed in claim 16, wherein the step of crosslinking said polymeric composition further comprises heating said polymeric composition to a temperature sufficient to crosslink an alkyne bond.

20. A thermoset polymer as claimed in claim 16, wherein the step of crosslinking said polymeric composition further comprises the step of irradiating said polymeric composition.

21. A thermoset polymer as claimed in claim 16, wherein said second compound comprises phenyl boronic acid.

22. A method of preparing a thermoset polymer comprising the steps of forming a polymeric having a repeating unit comprising at least one alkynyl group, at least one borate group, and at least one group selected from silyl groups and siloxyl groups, and crosslinking said polymeric composition through said at least one alkynyl group.

23. A method as claimed in claim 22, wherein the step of forming said polymeric composition comprises reacting a first compound comprising at least one alkynyl group, and at least one group selected from silyl groups and siloxyl groups, with a second compound selected from the group consisting of boric acid, hydrocarbon boronic acid, hydrocarbon borate, and pyroboric acid.

24. A method as claimed in claim 23, wherein said first compound comprises poly(siloxane-acetylene) and said second compound comprises boric acid.

25. A method as claimed in claim 22, wherein the step of crosslinking said polymeric composition further comprises heating said polymeric composition to a temperature sufficient to crosslink an alkyne bond.

26. A method as claimed in claim 22, wherein the step of crosslinking said polymeric composition further comprises the step of irradiating said polymeric composition.

27. A method of preparing a thermoset polymer comprising the step of reacting a first compound comprising at least one alkynyl group, and at least one group selected from silyl groups and siloxyl groups, with a second compound selected from the group consisting of boric acid, hydrocarbon boronic acid, hydrocarbon borate, and pyroboric acid under reaction conditions sufficient to crosslink a sufficient number of alkyne bonds to form the thermoset polymer.

28. A method as claimed in claim 27, wherein said first compound is a poly (siloxane-acetylene) and said second compound is boric acid.

29. A method as claimed in claim 27, wherein said second compound is phenyl boronic acid.

30. A method as claimed in claim 27, wherein one said reaction condition is a reaction temperature of at least 150° C.

31. A method as claimed in claim 27, wherein said first compound and said second compound are combined at a weight ratio of between 1:1 and 400:1, respectively.

32. A method as claimed in claim 27, wherein said first compound and said second compound are combined at a weight ratio of between 5:1 and 10:1, respectively.

33. A ceramic material made by pyrolyzing a polymer having a repeating unit comprising at least one siloxyl group, at least one crosslinking group having at least one unsaturated carbon-carbon bond and at least two crosslinking bonds, and at least one borate group.

34. A ceramic material as claimed in claim 31, wherein said repeating unit is represented by the formula:

Formula I wherein:

(1) m, n and y are independently selected from positive integers; z is selected from zero or positive integers;

(2) $R_1$, $R_2$, $R_3$, and $R_4$, are independently selected from a hydrocarbon group, hydrogen, a silane group, and a siloxane group;

(3) $R_5$ is selected from the group consisting of —OH, a hydrocarbon group, a siloxane group, and a repeating unit of the formula of the poly(siloxane acetylene);

(4) $R_6$ is $OR_5$ or a hydrocarbon group; and (5) Ae is a group with at least one unsaturated carbon-carbon bond and at least two crosslinking bonds.

35. A ceramic material prepared by pyrolyzing a composition comprising a first compound including at least one alkynyl group, and at least one group selected from silyl groups and siloxyl groups, and a second compound selected from the group consisting of boric acid, hydrocarbon boronic acid, hydrocarbon borate, and pyroboric acid.

36. A ceramic material prepared by a method comprising the steps of:

forming a thermoset polymer from a first compound comprising at least one alkynyl group, and at least one group selected from silyl groups and siloxyl groups, and a second compound selected from the group consisting of boric acid, hydrocarbon boronic acid, hydrocarbon borate, and pyroboric acid; and pyrolyzing said thermoset polymer.

* * * * *